H. FISHER.
Harvester.
No. 41,411. Patented Jan. 26, 1864.
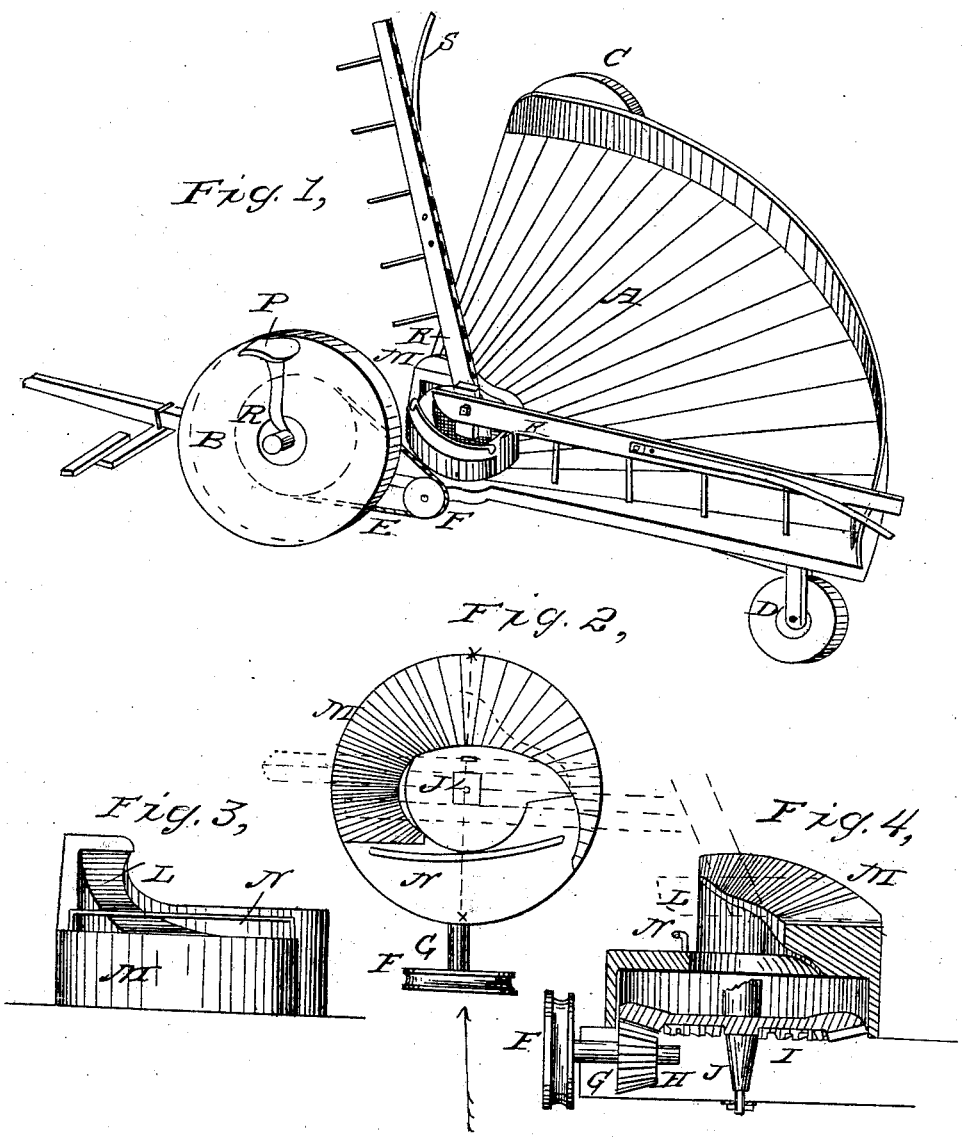

UNITED STATES PATENT OFFICE.

HENRY FISHER, OF ALLIANCE, ASSIGNOR TO HIMSELF, WM. M. WHITELEY, JEROME FASSLER, AND OLIVER S. KELLY, OF SPRINGFIELD, OHIO.

IMPROVEMENT IN HARVESTERS.

Specification forming part of Letters Patent No. 41,411, dated January 26, 1864.

*To all whom it may concern:*

Be it known that I, HENRY FISHER, of Alliance, in the county of Stark and State of Ohio, have invented certain new and useful Improvements in Harvesters; and I do hereby declare that the same are described and represented in the following specification and drawings.

The nature of my invention and improvements in harvesters consists in connecting the rake or rakes which reel or sweep the grain to the cutters and rake it from the platform to a revolving vertical shaft, so as to vibrate independent of each other, and vibrating the rakes as they are revolved by a stationary grooved camway, acting on the rear end of the rake-heads behind the fulcra on which they vibrate, and in arranging an arm or sweep in front of the rake for reeling or sweeping the grain to the cutters in advance of the rake.

To enable others skilled in the art to make and use my improvements, I will proceed to describe their construction and operation, referring to the accompanying drawings, in which the same letters indicate like parts in each of the figures.

Figure 1 represents such parts of a harvester as are necessary to show my improvements. Fig. 2 is a top view of the stationary camway. Fig. 3 is a side view seen in the direction of the blue arrow. Fig. 4 is a section on the line *x x* of Fig. 2.

In the above-mentioned drawings, A is the platform of the harvester, mounted on the wheels B, C, and D, the latter being a caster-wheel to facilitate the turning of the harvester.

B is the driving-wheel, provided with a pulley for the band E, which drives the pulley F and shaft G, carrying the pinion H, which drives the gear I and vertical shaft J, which carries the rakes or rake and sweep K K. One of the rake-heads may be used without teeth as a sweep to reel the grain to the cutters. The shafts G and J are arranged to turn in proper boxes, and the rake-heads K K vibrate on pivots on the shaft J independent of each other. These heads extend back behind their fulcra and pass into the groove L in the stationary cam M, which is fastened to the platform A and surrounds the shaft J and protects the gear I, as shown in section, Fig. 4. The cam M is made in the form shown in the drawings, so as to let the rake down near the front of the platform, and it passes around, sweeping the grain from the platform when the rear end of the rake-head enters the groove L in the cam M, which raises the rake up nearly perpendicular, so as to pass the man which drives the horses, and as the rear end of the rake passes out of the groove it passes onto the metal frame N on the cam, which forces the rake down near the front edge of the platform to sweep or rake the grain or gavel from the platform onto the ground. P is the driver's seat, supported by an extension of the linchpin R, which holds the wheel B on its axle, as shown in Fig. 1.

S is a curved arm fastened to the side of the rake-head K to reel or sweep down the grain in advance of the rake and insure its being cut before the rake moves it on the platform.

My improvement for raking the grain from the platform is simple and cheap, with very little liability to get out of order, and certain and efficient in its operation.

I believe I have described and represented my improvements in harvesters so as to enable any person to make and use them without further invention or experiment. I will now state what I desire to secure by Letters Patent, to wit:

I claim—

1. In combination with the stationary bowl or cam M, arranged as described, extending the rake-head back behind its fulcrum, so as to raise and control the rotating rake by the action of the camway on its heel or rear end, substantially as described.

2. In combination with the rake, the curved arm on the side of the rake to push the grain down in advance of the rake and insure its being cut before the rake shall move it on the platform.

Signed this 19th day of January, 1863, before Geo. W. Benns and Amos Whiteley.

HENRY FISHER.

Witnesses:
　AMOS WHITELEY,
　GEO. W. BENNS.